United States Patent
Wu et al.

(10) Patent No.: US 10,002,452 B2
(45) Date of Patent: Jun. 19, 2018

(54) SYSTEMS AND METHODS FOR AUTOMATIC APPLICATION OF SPECIAL EFFECTS BASED ON IMAGE ATTRIBUTES

(71) Applicant: CyberLink Corp., Shindian, Taipei (TW)

(72) Inventors: Chieh-Chung Wu, New Taipei (TW); Chin-Yu Hsu, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 8 days.

(21) Appl. No.: 14/743,412

(22) Filed: Jun. 18, 2015

(65) Prior Publication Data
US 2016/0098851 A1 Apr. 7, 2016

Related U.S. Application Data

(60) Provisional application No. 62/060,663, filed on Oct. 7, 2014.

(51) Int. Cl.
G06T 11/60 (2006.01)
G06K 9/00 (2006.01)

(52) U.S. Cl.
CPC .......... *G06T 11/60* (2013.01); *G06K 9/00228* (2013.01); *G06K 9/00389* (2013.01)

(58) Field of Classification Search
CPC . G06T 11/60; G06K 9/00228; G06K 9/00389
See application file for complete search history.

(56) References Cited

U.S. PATENT DOCUMENTS

| 2007/0113181 A1* | 5/2007 | Blattner | G06F 3/011 715/706 |
| 2009/0016617 A1 | 1/2009 | Bregman-Amitai et al. | |
| 2010/0329822 A1* | 12/2010 | Gear | B42C 1/12 412/6 |
| 2012/0158515 A1* | 6/2012 | K. | G06Q 30/0269 705/14.66 |
| 2014/0341476 A1* | 11/2014 | Kulick | G06K 9/6267 382/224 |

FOREIGN PATENT DOCUMENTS

JP 2011239357 A 11/2011

OTHER PUBLICATIONS

Mapera | Location visualizer. Jul. 27, 2014.

* cited by examiner

*Primary Examiner* — Jwalant Amin
(74) *Attorney, Agent, or Firm* — McClure, Qualey & Rodack, LLP

(57) ABSTRACT

An image editing device is configured to automatically apply special effects to a digital image. In the image editing device, a digital image is obtained, and a selection is retrieved from a user, where the user selection specifying at least one criterion. At least one attribute of the digital image is analyzed, and a determination is made on whether the at least one attribute coincides with a target attribute associated with the at least one criterion. Responsive to the at least one attribute coinciding with the target attribute, a special effect is obtained from a data store, and the obtained special effect is applied to the digital image.

22 Claims, 9 Drawing Sheets

SYSTEMS AND METHODS FOR AUTOMATIC APPLICATION OF SPECIAL EFFECTS BASED ON IMAGE ATTRIBUTES

CROSS-REFERENCE TO RELATED APPLICATION

This application claims priority to, and the benefit of, U.S. Provisional Patent Application entitled, "Automatic Application of Special Effects Based on Image Attributes," having Ser. No. 62/060,663, filed on Oct. 7, 2014, which is incorporated by reference in its entirety.

TECHNICAL FIELD

The present disclosure generally relates to editing multimedia content and more particularly, to a system and method for automatic application of special effects based on image attributes.

BACKGROUND

As smartphones and other mobile devices have become ubiquitous, people have the ability to take digital images virtually any time. However, the process of selecting and incorporating special effects to further enhance digital images can be challenging and time-consuming.

SUMMARY

Briefly described, one embodiment, among others, is a method implemented in an image editing device. The method comprises obtaining a digital image and retrieving a selection from a user, where the user selection specifies at least one criterion. The method further comprises analyzing at least one attribute of the digital image and determining whether the at least one attribute coincides with a target attribute associated with the at least one criterion. Responsive to the at least one attribute coinciding with the target attribute, a special effect is obtained from a data store, and the obtained special effect is applied to the digital image.

Another embodiment is an image editing system for automatically applying special effects. The image editing system comprises a processor and an application executable in the processor. The application comprises a media interface component for obtaining a digital image and a user interface component for retrieving a selection from a user, the user selection specifying at least one criterion. The application further comprises an image content analyzer for analyzing at least one attribute of the digital image and for determining whether the at least one attribute coincides with a target attribute associated with the at least one criterion. The application further comprises a special effects component for obtaining a special effect from a data store responsive to the at least one attribute coinciding with the target attribute and for applying the obtained special effect to the digital image.

Another embodiment is a non-transitory computer-readable medium embodying a program executable in a computing device, comprising code that obtains a digital image depicting an individual, code that determines a context of an event associated with the digital image by extracting at least one of time and location information contained in metadata encoded in the digital image and comparing the extracted data against calendar data. The non-transitory computer-readable medium further comprises code that obtains a cosmetic effect from a data store based on the determined event context and code that applies the obtained cosmetic effect to the digital image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for analyzing attributes associated with digital images and automatically applying special effects based on the analysis. The special effects may comprise, but are not limited to, one or more graphics applied to the facial region of an individual depicted in the digital image. For example, the graphics may be applied to simulate the appearance of cosmetic make-up applied to the individual's face. The special effects may also include one or more graphics applied to other parts of the individual. For example, the graphics may be applied to simulate the appearance of clothing or other material worn by the individual.

The user of the system specifies the criterion to be applied in determining which special effects to be automatically retrieved and applied to a digital image. For example, the user may specify that the special effects automatically applied to an individual (e.g., in the facial region) are event-based, where the individual depicted in the image previously participated in a planned activity such as a social gathering, a sporting event, and so on.

The user may also specify that the special effects applied to the individual are based on date and/or time. For example, the special effects may be applied based on a determination that the individual is no longer working at the office based on the time/date (e.g., Saturday) of the digital image. The user may also specify that the special effects be applied to the individual based on location data associated with the digital image, whereby the location data (derived, for example, via GPS, WiFi) may be embodied as metadata encoded in the digital image.

Figure 1:
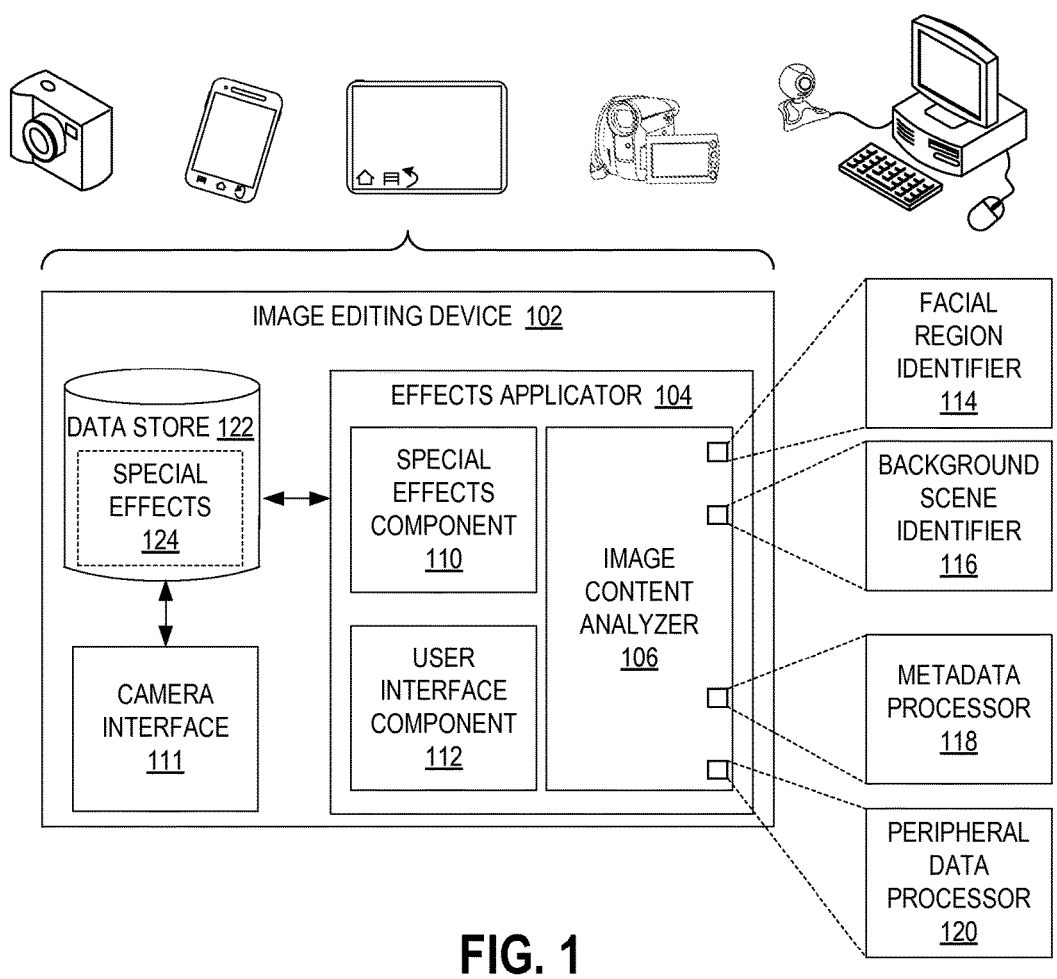
FIG. 1 is a block diagram of an image editing device in which the image editing techniques disclosed herein may be implemented in accordance with various embodiments of the present disclosure.

FIG. 1 is a block diagram of an image editing device 102 in which the image editing techniques disclosed herein may be implemented. The image editing device 102 may be embodied as a computing device equipped with digital content recording capabilities such as, but not limited to, a digital camera, a smartphone, a tablet computing device, a digital video recorder, a laptop computer coupled to a webcam, and so on.

An effects applicator 104 executes on a processor of the image editing device 102 and includes various components including an image content analyzer 106, a special effects component 110, and a user interface component 112. The image content analyzer 106 is configured to analyze the content of digital images captured by the camera module 111 and/or received from a remote source. The image content analyzer 106 may also be configured to analyze content of digital images stored on a storage medium such as, by way of example and without limitation, a compact disc (CD), a universal serial bus (USB) flash drive, or cloud storage, wherein the digital images may then be transferred and stored locally on a hard drive of the image editing device 102.

The digital images processed by the image content analyzer 106 may be received by a media interface component (not shown) and encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or other digital formats.

Note that the digital images may also be extracted from media content encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The image content analyzer 106 determines characteristics of the content depicted in digital images and includes a facial region identifier 114 and a background scene identifier 116. The facial region identifier 114 analyzes attributes of each individual depicted in the digital images and identifies the location of each individual's eyes, nose, mouth, and so on. The background scene identifier 116 analyzes attributes of the scene in the digital images and identifies objects such as buildings, landmarks, and so on. The attributes of the scene may comprise, for example, colors, contour of background objects, brightness, and so on.

The image content analyzer 106 is further configured to derive contextual cues associated with the digital images by analyzing data encoded in the digital images where such cues may be used to determine the context or event associated with the digital images. For some embodiments, the image content analyzer 106 is configured to analyze such attributes as the color palette, brightness level, and/or other attributes of the content depicted in the digital images. Based on the presence of certain colors, the image content analyzer 106 may predict the event or context of the digital image. For example, the predominant presence of the color green in the digital image may correspond to an outdoor activity (e.g., a picnic), whereas the predominant presence of the color blue may correspond to the presence of water (e.g., a beach side activity). To further illustrate, a high brightness level may correspond to a sunny day, whereas a low brightness level may correspond to a cloudy day, where the threshold brightness level(s) may be specified by the user. For some embodiments, the image content analyzer 106 further includes a metadata processor 118 configured to extract metadata encoded in the digital images. The metadata may comprise, but is not limited to, location data, time stamp, date stamp, keywords, tags, and other descriptive data characterizing the content and context of the digital images.

The peripheral data processor 120 in the image content analyzer 106 analyzes data external to the digital images. Specifically, the peripheral data processor 120 may be granted permission by the user of the image editing device 102 to access personal data stored by the user on the image editing device 102, where the personal data may comprise calendar data, social media data, and so on. For example, the user may elect to allow the peripheral data processor 120 to access the user's calendar, which specifies events and activities that the user attended. The social media data may specify the user's age, facial recognition data for identifying the user, the user's occupation, and/or other information associated with the user.

The user interface component 112 is configured to provide a user interface to the user of the image editing device and allow the user to specify which criterion to apply for facilitating the automatic application of special effects. For example, the user may specify via the user interface that special effects are to be applied based on events associated with digital images. Based on the selected criterion and based on the analysis performed by the image content analyzer 106, the special effects component 110 obtains corresponding special effects 124 from a data store 122 in the image editing device. The obtained special effect(s) is then applied to the digital image being processed.

Figure 2:
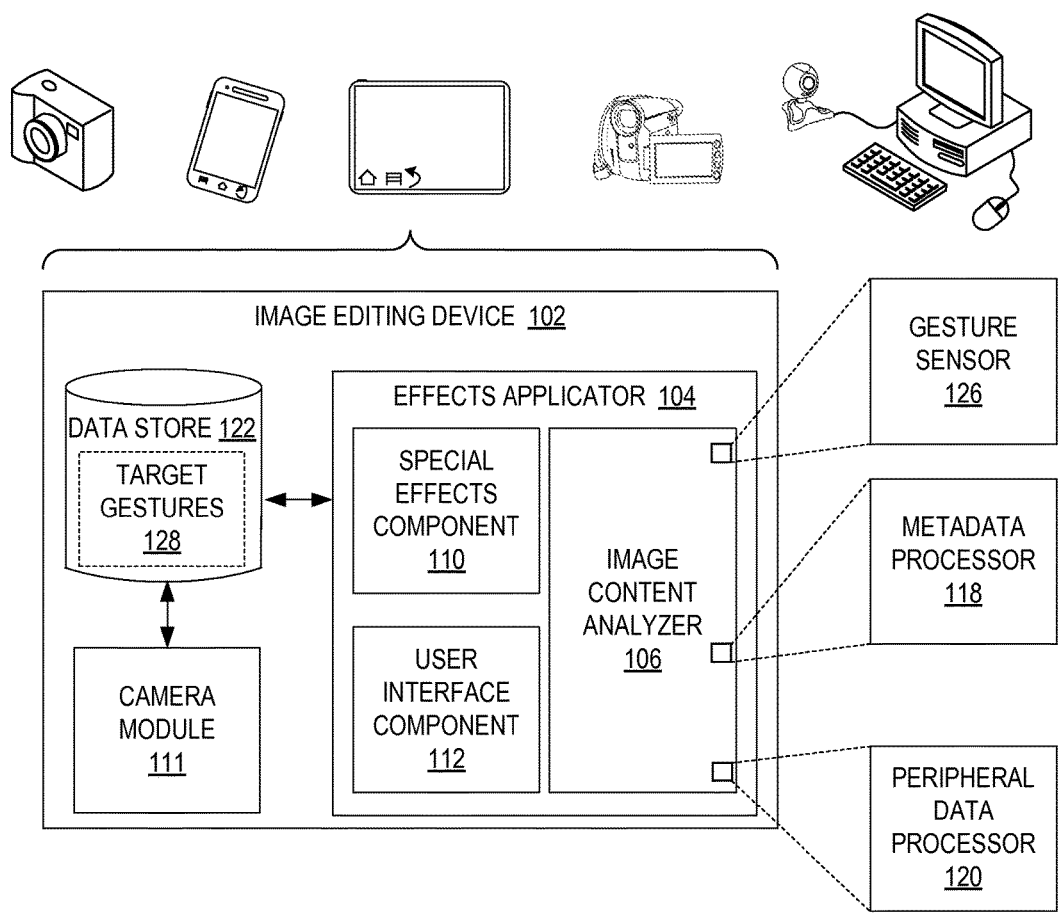
FIG. 2 illustrates an alternative embodiment of the effects applicator where the image content analyzer further comprises a gesture sensor for automatically applying special effects based on gestures depicted in the digital image in accordance with various embodiments of the present disclosure.

FIG. 2 shows another embodiment of the effects applicator 104 where the image content analyzer 106 further comprises a gesture sensor 126 for automatically applying special effects based on gestures depicted in the digital image. Note that the gesture sensor 126 may be executed separately or in conjunction with the other components of the image content analyzer 106 (facial region identifier 114, background scene identifier 116). The gesture sensor 126 is configured to identify the depiction of one or more target gestures 128 in the digital images, where the target gestures 128 may be stored in the data store 122. The target gestures 128 may be stored in the data store 122 in various formats. For example, the target gestures 128 may be stored in the form of representative digital images depicting the target gestures (e.g., a digital image of an individual waving) and/or in the form of graphical depictions (e.g., line drawings) of the target gestures.

In operation, the gesture sensor 126 identifies the presence of one or more target gestures of interest in a digital image. Based on the determination that one or more target gestures of interest are depicted in the digital image, the effects applicator 104 applies one or more pre-determined special effects associated with the target gesture(s). For example, a thumbs-up gesture detected by the gesture sensor 126 may result in a particular special effect graphic being retrieved from the data store 122 and superimposed onto the digital image. Each target gesture 128 in the data store 122 may be associated with a corresponding special effect. Note that the target gestures 128 in the data store 122 may be specified by the user of the image editing device 102.

Figure 3:
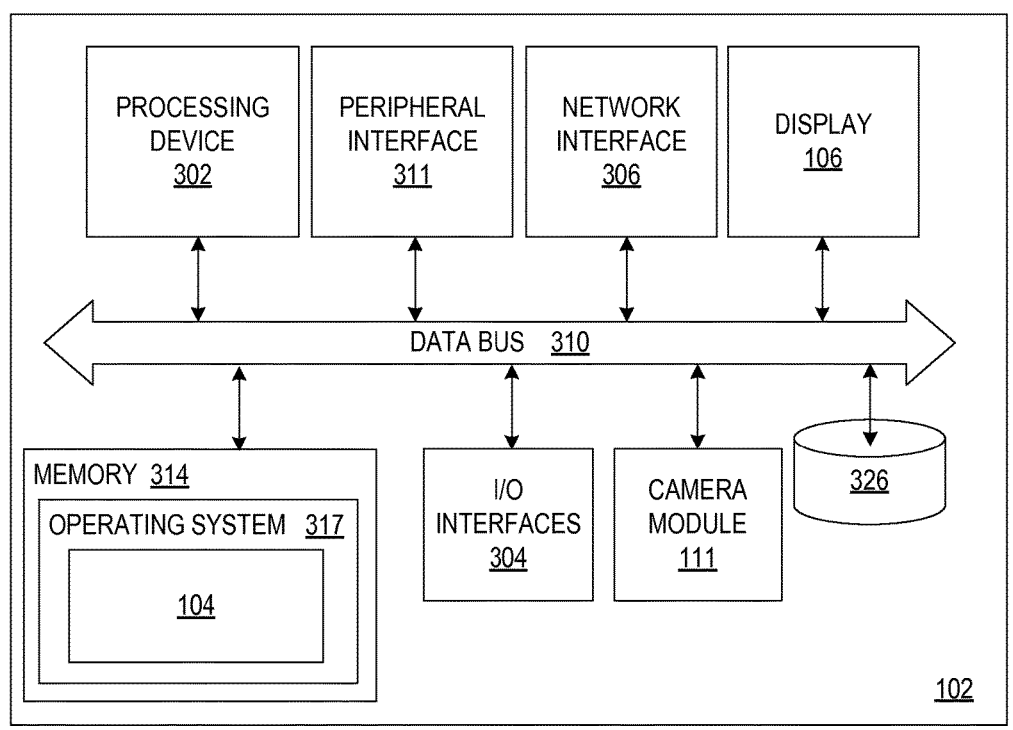
FIG. 3 is a schematic diagram of the image editing device of FIG. 1 in accordance with various embodiments of the present disclosure.

FIG. 3 is a schematic diagram of the image editing device 102 shown in FIG. 1. The image editing device 102 may be embodied in any one of a wide variety of wired and/or wireless computing devices, such as a desktop computer, portable computer, dedicated server computer, multiprocessor computing device, smartphone, tablet computing device, and so forth. As shown in FIG. 3, the image editing device 102 comprises memory 314, a processing device 302, a number of input/output interfaces 304, a network interface 306, a display 106, a camera module 111, and mass storage 326, wherein each of these devices are connected across a local data bus 310.

The processing device 302 may include any custom made or commercially available processor, a central processing unit (CPU) or an auxiliary processor among several processors associated with the image editing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 314 can include any one of a combination of volatile memory elements (e.g., random-access memory (RAM, such as DRAM, and SRAM, etc.)) and nonvolatile memory elements (e.g., ROM, hard drive, CDROM, etc.). The memory 314 typically comprises a native operating system 317, one or more native applications, emulation systems, or emulated applications for any of a variety of operating systems and/or emulated hardware platforms, emulated operating systems, etc.

The applications may include application specific software which may comprise some or all the components (effects applicator 104) of the image editing device 102 depicted in FIG. 1. In accordance with such embodiments, the components are stored in memory 314 and executed by the processing device 302. One of ordinary skill in the art will appreciate that the memory 314 can, and typically will, comprise other components which have been omitted for purposes of brevity.

Although the components of the image editing device 102 and other various components described herein may be embodied in software or code executed by general purpose hardware as discussed above, the components of the image editing device 102 may also be embodied in dedicated hardware or a combination of software/general purpose hardware and dedicated hardware. If embodied in dedicated hardware, each can be implemented as a circuit or state machine that employs any one of or a combination of a number of technologies.

The term "executable" may refer to a program file that is in a form that can be run by the processing device 302. Examples of executable programs may comprise, for example, a compiled program that can be translated into machine code in a format that can be loaded into a random access portion of the memory 314 and run by the processing device 302, source code that may be expressed in proper format such as object code that is capable of being loaded into a random access portion of the memory 314 and executed by the processing device 302, or source code that may be interpreted by another executable program to generate instructions in a random access portion of the memory 314 to be executed by the processing device 302, etc. An executable program may be stored in any portion or component of the memory 314 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. Input/output interfaces 304 provide any number of interfaces for the input and output of data.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 3, network interface 306 comprises various components used to transmit and/or receive data over a network environment. The image editing device 102 may communicate with one or more computing devices via the network interface 306 over a network. A peripheral interface (not shown) of the image editing system 102 supports various interfaces including, but not limited to IEEE-1394 High Performance Serial Bus (Firewire), USB, a serial connection, and a parallel connection.

Figure 4:
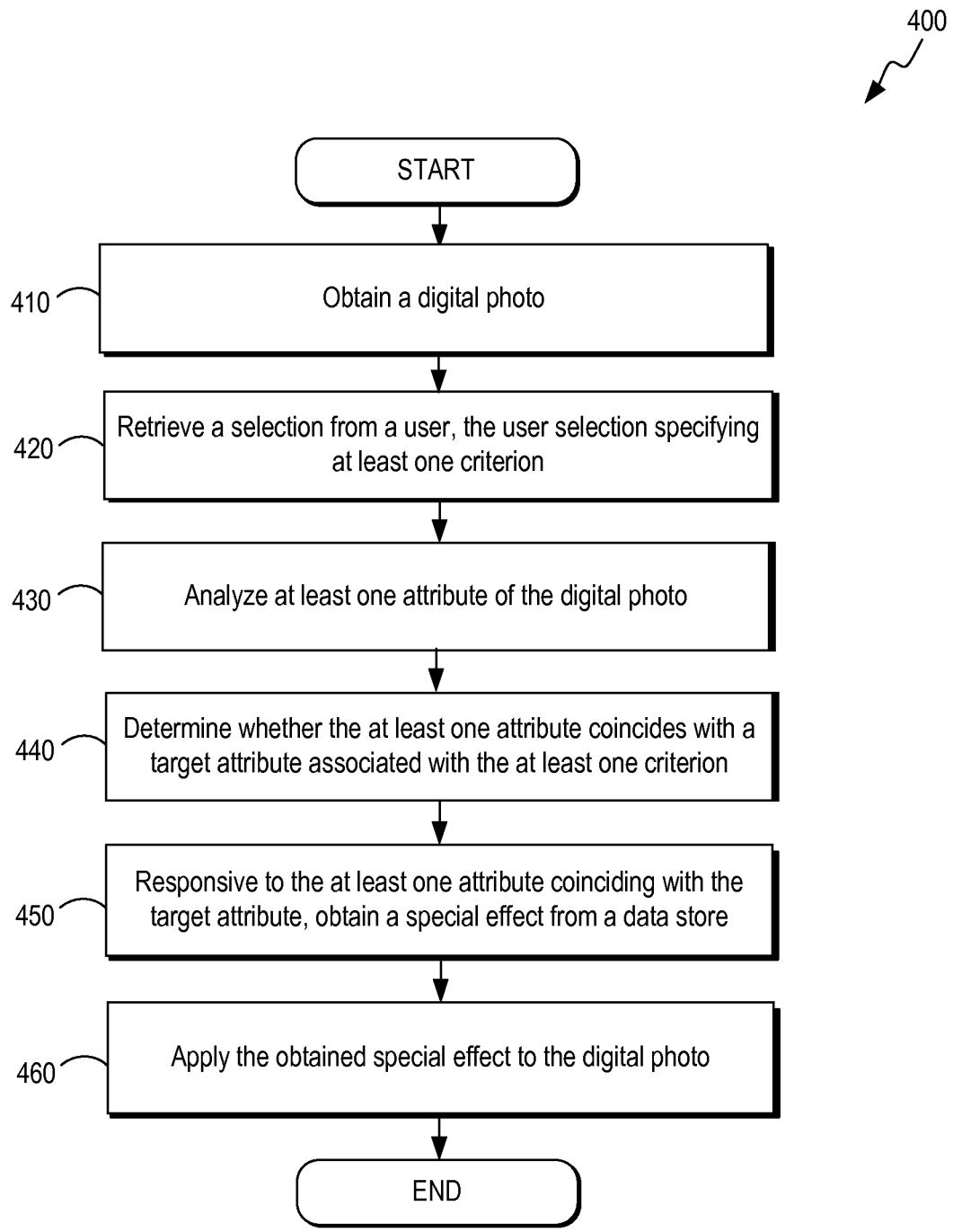
FIG. 4 is a top-level flowchart illustrating examples of functionality implemented as portions of the image editing of FIG. 1 for automatically applying special effects according to various embodiments of the present disclosure.

Reference is made to FIG. 4, which is a flowchart 400 in accordance with one embodiment for automatically applying special effects performed by the image editing device 102 of FIG. 1. It is understood that the flowchart 400 of FIG. 4 provides merely an example of the many different types of functional arrangements that may be employed to implement the operation of the various components of the image editing device 102. As an alternative, the flowchart of FIG. 4 may be viewed as depicting an example of steps of a method implemented in the image editing device 102 according to one or more embodiments.

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. It is understood that all such variations are within the scope of the present disclosure.

Beginning with block 410, the media interface component in the image editing device 102 obtains a digital image. In block 420, the user interface component 112 (FIG. 1) retrieves a selection from a user of the image editing device 102, where the selection by the user specifies at least one criterion. In block 430, the image content analyzer 106 (FIG. 1) analyzes at least one attribute of the digital image. In block 440, the image content analyzer 106 determines whether the at least one attribute coincides with a target attribute associated with the at least one criterion. In block 450, the special effects component 110 (FIG. 1) obtains a special effect from a data store responsive to the at least one attribute coinciding with the target attribute. In block 460, the special effects component 110 applies the obtained special effect to the digital image.

Figure 5A:
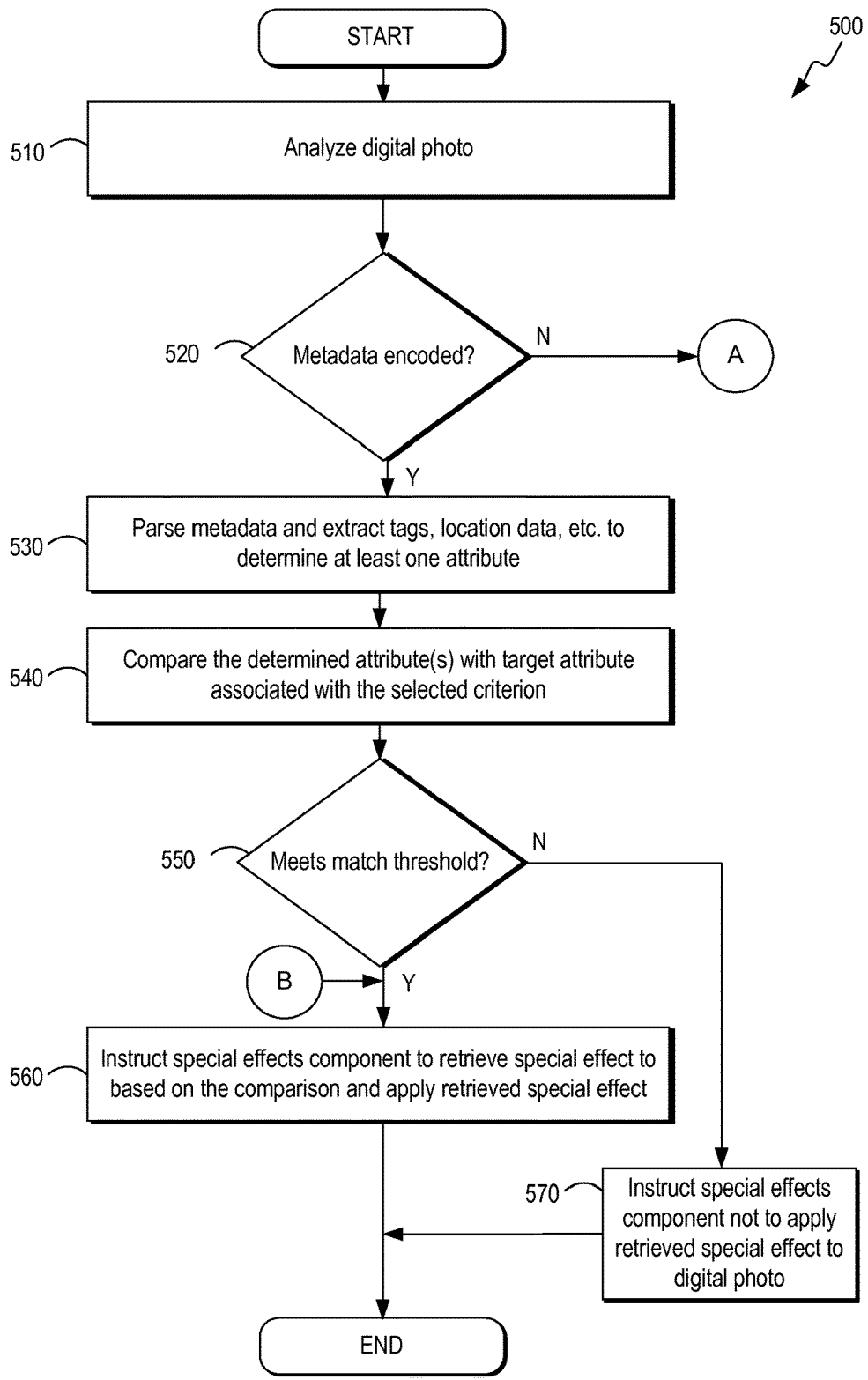
FIGS. 5A and 5B depict a top-level flowchart in accordance with one embodiment for further describing the operations performed by the image content analyzer of FIG. 1 of analyzing one of more attributes of the digital image and determining whether the one or more attributes coincide with a target attribute according to various embodiments of the present disclosure.
Figure 5B:
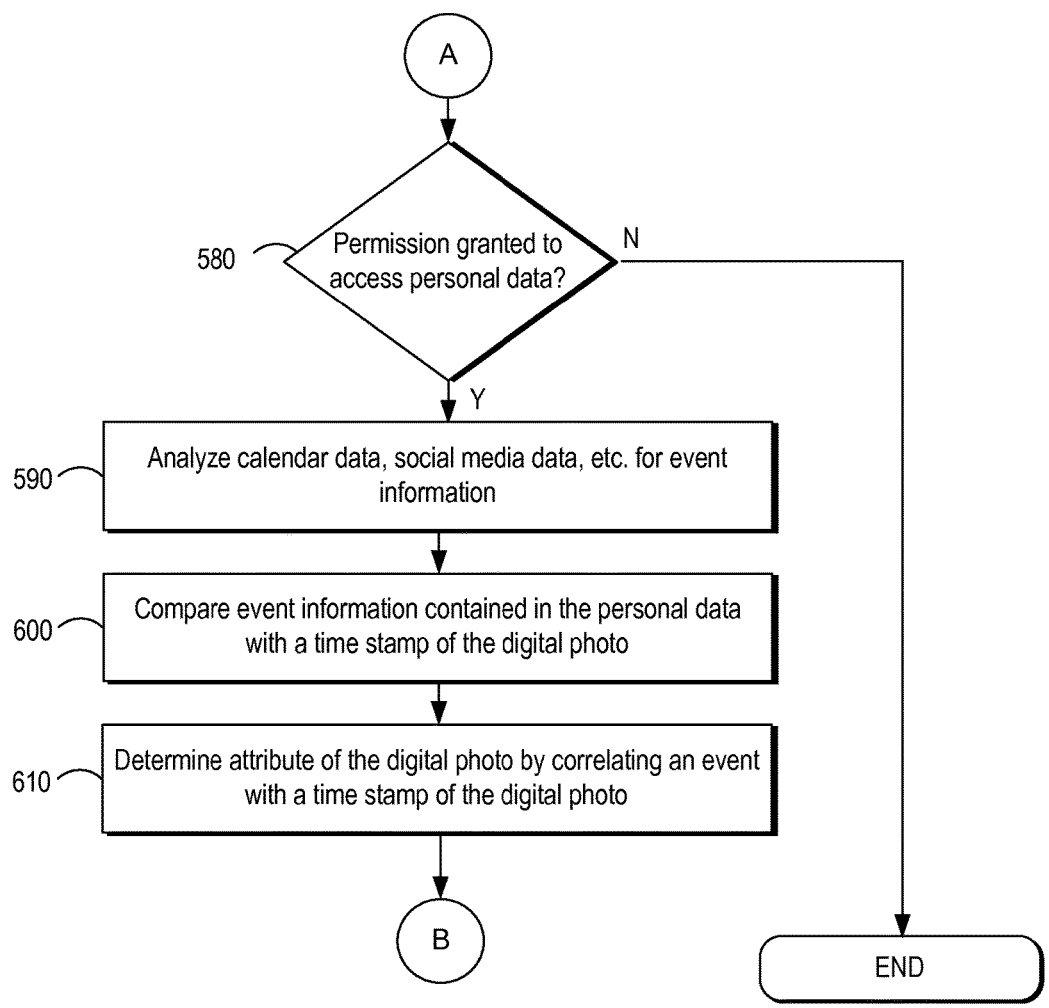

Reference is made to FIGS. 5A and 5B, which is a flowchart 500 in accordance with one embodiment for further describing the operations performed by the image content analyzer 106 (FIG. 1) of analyzing one of more attributes of the digital image and determining whether the one or more attributes coincide with a target attribute. It is understood that the flowchart 500 of FIGS. 5A and 5B provides merely an example of the many different types of functional arrangements that may be employed to implement the operation of the various components of the image editing device 102. As an alternative, the flowchart of FIGS. 5A and 5B may be viewed as depicting an example of steps of a method implemented in the image editing device 102 according to one or more embodiments.

Although the flowchart of FIGS. 5A and 5B shows a specific order of execution, it is understood that the order of execution may differ from that which is depicted. For example, the order of execution of two or more blocks may be scrambled relative to the order shown. Also, two or more blocks shown in succession in FIGS. 5A and 5B may be executed concurrently or with partial concurrence. It is understood that all such variations are within the scope of the present disclosure.

Beginning with block 510, the image content analyzer 106 (FIG. 1) analyzes the contents of the digital image and in decision block 520, a determination is made on whether the digital image contains any metadata. If metadata is encoded in the digital image, then in block 530, the image content analyzer 106 parses the metadata and extracts such data as tag data, location data, time stamp, and so on to determine one or more attributes associated with the content of the digital image. For some embodiments, the image content analyzer 106 may be configured to search for a one or more specific pieces of information contained in the metadata. For example, the image content analyzer 106 may be configured to specifically search for location data, time stamp, and tag data describing an event associated with the digital image.

In block 540, the image content analyzer 106 compares the determined attribute(s) of the digital image with one or more target attributes associated with the criterion selected by the user. To illustrate, suppose that the selected criterion comprises an event-based criterion. The target attributes associated with this criterion may comprise by way of example and without limitation, a birthday event, a sporting event, a wedding event, a concert event, and so on. Notably, each criterion has one or more predetermined target attributes.

In decision block 550, the image content analyzer 106 determines whether the determined attribute(s) of the digital image coincides with one or more the target attributes of the selected criterion by determining whether the determined attribute(s) match any of the one or more target attributes within a threshold degree of similarity. For example, a determined attribute of the digital image may comprise the time (and date) in which the digital image was taken (e.g., 7:00 pm). A target attribute may comprise an attribute of "after work hours" and specify a time of 6:00 pm as the end of business time. In this example, the image content analyzer 106 may determine that the determined attribute 7:00 pm coincides with the target attribute of "after work hours" based on the specified threshold (6:00 pm) of the target attribute.

If the determined attribute(s) coincide with the target attribute, then in block 560, the image content analyzer 106 instructs the special effects component 110 (FIG. 1) to retrieve one or more special effects based on the match result and instructs the special effects component 110 to apply the retrieved special effect to the digital image. With reference to the example above, the special effects may comprise one or more cosmetic make-up effects to be applied to the individual's face. If the determined attribute(s) does not coincide with the target attribute, then in block 570, the image content analyzer 106 instructs the special effects component 110 (FIG. 1) not to apply the retrieved special effect to the digital image.

Returning to decision block 520, if no metadata is encoded in the digital image, then the image content analyzer 106 attempts to determine one or more attributes of the digital image by comparing a time stamp (i.e., time/date stamp of the digital image file) associated with the digital image with information contained in personal data of the user of the image editing system 102. Specifically, the image content analyzer 106 proceeds to decision block 580 (FIG. 5B) where a determination is made on whether the user of the image editing device 102 has granted permission for the effects applicator 104 (FIG. 1) to access personal data stored locally on the image editing device 102 and/or stored in the cloud.

If the user has granted permission for the effects applicator 104 to access the user's personal information, then in block 590, the image content analyzer 106 analyzes such data as calendar data and social media data to extract event information. For example, the user may have posted a status update on a social media website that the user attended a certain sporting event at a particular time/date. In block 600, the image content analyzer 106 compares the extracted event information contained in the personal data with the time stamp of the digital image, and in block 610, the image content analyzer 106 determines an attribute of the digital image by correlating the event with the time stamp of the digital image. With reference to the example above, the image content analyzer 106 may determine based on the time stamp of the digital image that the content of the digital image corresponds to the sporting event that the user attended. The process then proceeds to block 560 (FIG. 5A), where the image content analyzer 106 instructs the special effects component 110 to retrieve one or more special effects based on the match result and instructs the special effects component 110 to apply the retrieved special effect to the digital image. Referring back to decision block 580 (FIG. 5B), if the user has elected not to allow the effects applicator 104 to access the user's personal data, then no further action is taken.

Figure 6:
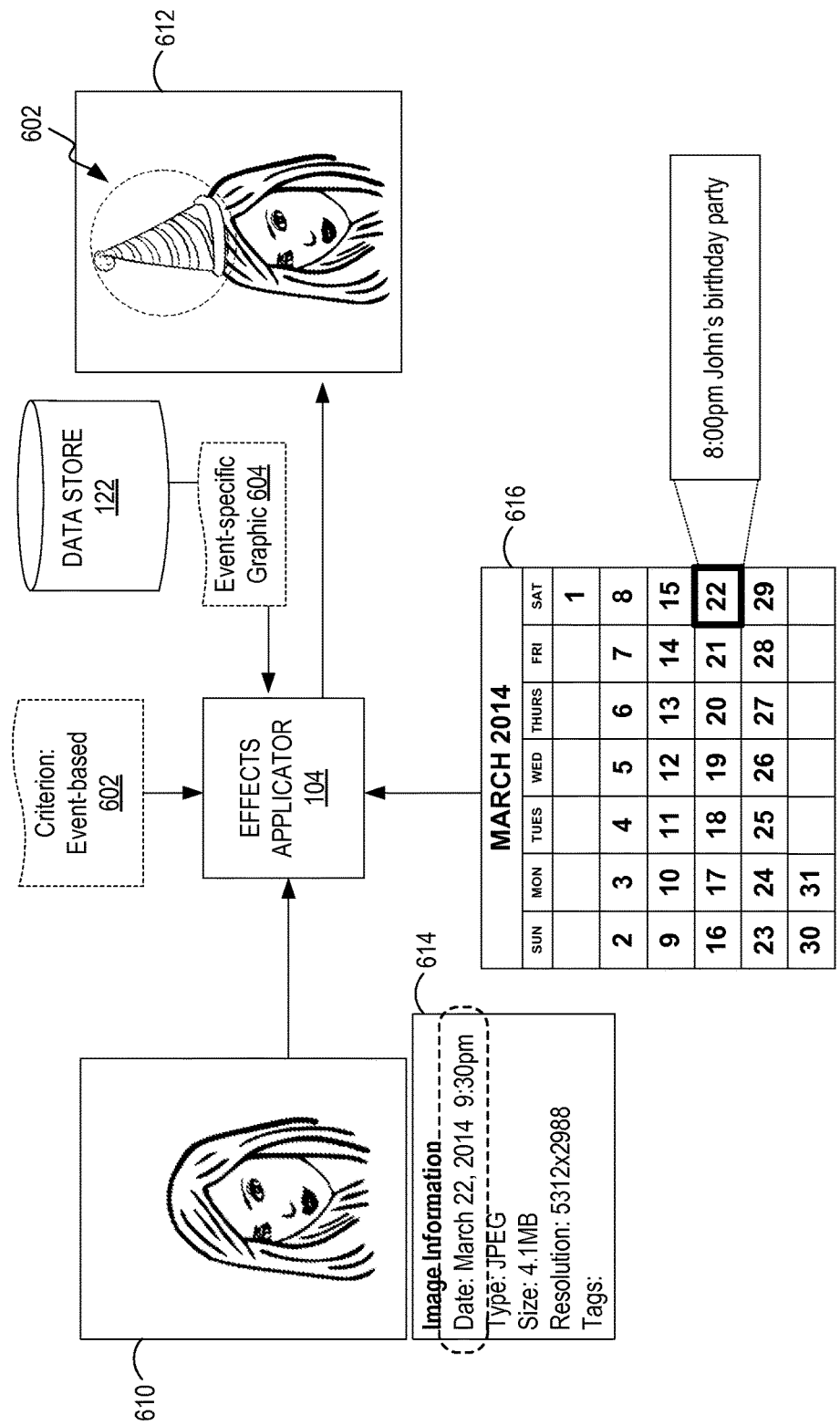
FIG. 6 illustrates an example whereby the effects applicator in the image editing device of FIG. 1 applies an event-based special effect to a digital image according to various embodiments of the present disclosure.

FIG. 6 illustrates an example whereby the effects applicator 104 in the image editing device 102 (FIG. 1) applies an event-based special effect to a digital image. In the example shown, the image content analyzer 106 (FIG. 1) in the effects applicator 104 analyzes a time/date stamp 614 of the digital image and the user's calendar data 616. Note that the time/date 614 may be extracted from metadata encoded in the digital image 610 or extracted from the computer file time stamp indicating when the digital image was last modified.

The effects applicator 104 receives a selection from the user of the image editing device 102, where the selection specifies a criterion for automatically applying a special effect to the digital image 610. In the example shown, the user elects to have special effects applied based on an event-based criterion 602. As shown, the user's calendar data 616 contains information relating to an event that the user attended. The image content analyzer 106 determines that an attribute (i.e., time stamp 614) of the digital image 610 coincides with an event that the user attended and therefore concludes that the digital image is likely associated with the event specified in the calendar (i.e., birthday party). Based on this determination, the image content analyzer 106 instructs the special effects component 110 (FIG. 1) to retrieve a corresponding event-specific graphic 604. In the example shown, the event-specific graphic 604 comprises a birthday hat 602 that is incorporated by the special effects component 110 (FIG. 1) on top of the individual's head to generate a modified digital image 612.

Figure 7:
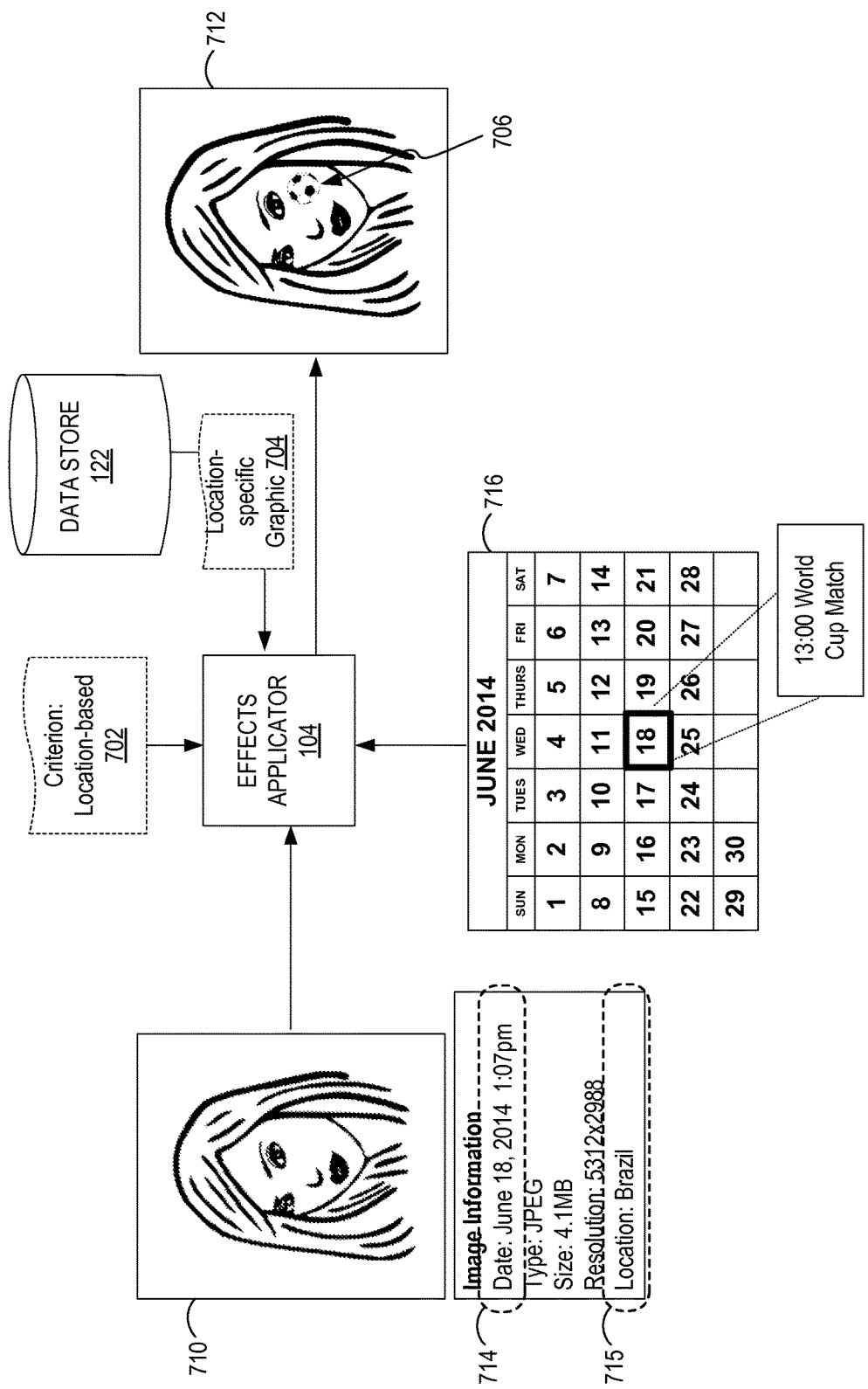
FIG. 7 illustrates an example whereby the effects applicator in the image editing device of FIG. 1 applies a location-based special effect to a digital image according to various embodiments of the present disclosure.

FIG. 7 illustrates an example whereby the effects applicator 104 in the image editing device 102 (FIG. 1) applies a location-based special effect to a digital image. In the example shown, the image content analyzer 106 (FIG. 1) in the effects applicator 104 analyzes a time/date stamp 714 and location information encoded in metadata of the digital image in conjunction with the user's calendar data 717. Specifically, the effects applicator 104 receives a digital image 710 and extracts a time/date stamp 714 and location information 714 from the metadata encoded in the digital image 710.

In the example shown, the user elects to have special effects applied based on a location-based criterion 702. As shown, the user's calendar data 717 contains information relating to an event that the user attended. The image content analyzer 106 determines that attributes (i.e., time and location) of the digital image 710 coincides with a location (and event) of the user and therefore concludes that the digital image is likely associated with the location (and event) specified in the calendar (i.e., soccer match). Based on this determination, the image content analyzer 106 instructs the special effects component 110 (FIG. 1) to retrieve a corresponding location-specific graphic 704. In the example shown, the location-specific graphic 704 comprises a soccer ball graphic 706 that is incorporated by the special effects component 110 (FIG. 1) on the individual's face to generate a modified digital image 712.

Figure 8:
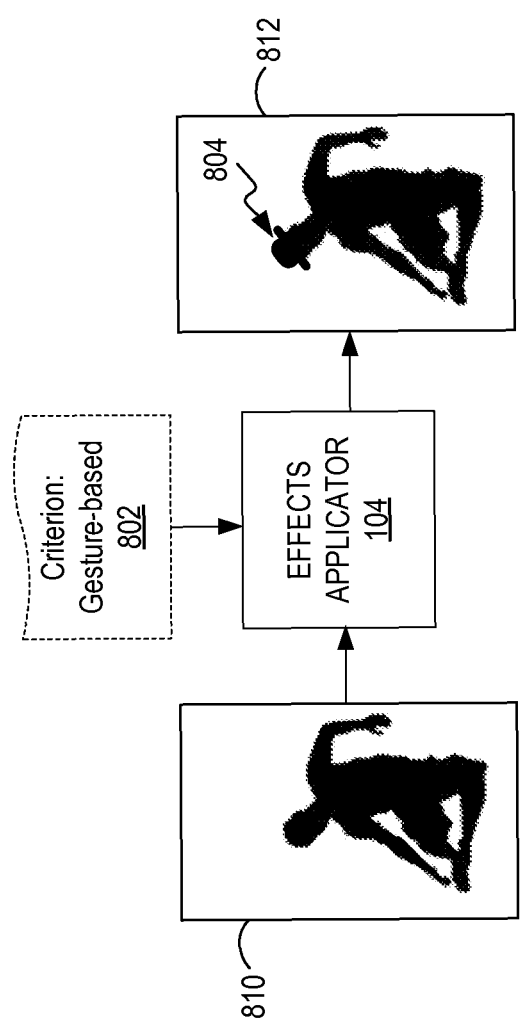
FIG. 8 illustrates another example whereby the effects applicator applies a special effect based on a gesture or pose depicted in the digital image according to various embodiments of the present disclosure.

FIG. 8 illustrates another example whereby the effects applicator 104 applies a special effect based on a gesture or pose depicted in the digital image 810. In the example shown, the gesture sensor 126 (FIG. 2) determines that the individual depicted in the digital image 810 is jumping. Based on this determination, the special effects component 110 (FIG. 2) obtains a corresponding special effect and applies the special effect to the individual depicted in the digital image (e.g., a hat placed on the head of the individual to represent dancing or a snowboard placed on the feet of the individual to represent skiing).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in an image editing device, comprising:
    obtaining a digital image;
    retrieving a selection from a user, the user selection specifying at least one criterion;
    analyzing at least one attribute of the digital image by analyzing at least one of the attributes of an individual or the attributes of a scene in the digital image to determine an event associated with the digital image, wherein analyzing the attributes of the individual comprises comparing event information contained in personal data relating to a user of the image editing device with a time stamp of the digital image;
    determining whether the at least one attribute coincides with a target attribute associated with the at least one criterion based on the event;
    responsive to the at least one attribute coinciding with the target attribute, obtaining a special effect from a data store; and
    applying the obtained special effect to the digital image, wherein applying the obtained special effect to the digital image comprises:
        identifying a facial region of an individual in the digital image; and
        applying the special effect to the facial region, wherein the special effect comprises a cosmetic make-up effect for modifying an appearance of the facial region.

2. The method of claim 1, wherein the criterion comprises at least one of: an event-based criterion, a time-based criterion, and a location-based criterion.

3. The method of claim 1, wherein the criterion comprises a gesture-based criterion.

4. The method of claim 3, wherein the target attribute comprises one or more of a target gesture and target pose depicted by an individual in the digital image.

5. The method of claim 1, wherein determining whether the at least one attribute coincides with the target attribute associated with the at least one criterion comprises analyzing metadata corresponding to the at least one criterion, the metadata being encoded in the digital image.

6. The method of claim 5, wherein the personal data comprises at least one of calendar data and social media data, wherein the calendar data specifies at least one scheduled event, and wherein the social media data specifies at least one of an age of the user, facial recognition data for identifying the user, and an occupation of the user.

7. The method of claim 5, further comprising obtaining permission from the user of the image editing system to access the personal data, wherein the personal data is stored on at least one of the image editing system and cloud storage.

8. The method of claim 1, wherein analyzing at least one attribute of the digital image further comprises:
    analyzing the digital image to predict an event type, wherein analyzing the digital image comprises analyzing at least one of color and brightness of the digital image to predict the event type of the digital image.

9. The method of claim 1, wherein applying the obtained special effect to the digital image comprises:
identifying a facial region of an individual in the digital image;
identifying a head of the individual; and
applying the special effect on the head of the individual, wherein the special effect comprises an article of headwear.

10. The method of claim 1, wherein applying the obtained special effect to the digital image comprises:
identifying a facial region of an individual in the digital image;
identifying a body region of the individual; and
applying the special effect to the body region, wherein the special effect comprises an accessory or clothing effect for modifying an appearance of the body region.

11. The method of claim 1, further comprising:
displaying, by the image editing device, a user interface for allowing a user to specify the at least one criterion;
wherein retrieving the selection from the user and applying the obtained special effect to the digital image are performed by the image editing device.

12. An image editing system for automatically applying special effects, comprising:
a memory storing instructions; and
a processor coupled to the memory and configured by the instructions to at least:
obtain a digital image;
retrieve a selection from a user, the user selection specifying at least one criterion;
analyze at least one attribute of the digital image by analyzing at least one of the attributes of an individual or the attributes of a scene in the digital image to determine an event associated with the digital image, wherein analyzing the attributes of the individual comprises comparing event information contained in personal data relating to a user of the image editing system with a time stamp of the digital image;
determine whether the at least one attribute coincides with a target attribute associated with the at least one criterion based on the event; and
obtain a special effect from a data store responsive to the at least one attribute coinciding with the target attribute and for applying the obtained special effect to the digital image, wherein applying the obtained special effect to the digital image comprises:
identifying a facial region of an individual in the digital image; and
applying the special effect to the facial region, wherein the special effect comprises a cosmetic make-up effect for modifying an appearance of the facial region.

13. The system of claim 12, wherein the criterion comprises at least one of:
an event-based criterion, a time-based criterion, and a location-based criterion.

14. The system of claim 12, wherein the criterion comprises a gesture-based criterion.

15. The system of claim 14, wherein the target attribute comprises one or more of a target gesture and target pose depicted by an individual in the digital image.

16. The system of claim 12, wherein the processor is further configured by the instructions to determine whether the at least one attribute coincides with the target attribute associated with the at least one criterion by analyzing metadata corresponding to the at least one criterion, the metadata being encoded in the digital image.

17. The system of claim 16, wherein the personal data comprises at least one of calendar data and social media data.

18. The system of claim 12, wherein the processor is further configured by the instructions to apply the obtained special effect to the digital image by:
identifying a facial region of an individual in the digital image;
identifying a head of the individual; and
applying the special effect on the head of the individual, wherein the special effect comprises an article of headwear.

19. The system of claim 12, wherein the processor is further configured by the instructions to apply the obtained special effect to the digital image by:
identifying a facial region of an individual in the digital image;
identifying a body region of the individual; and
applying the special effect to the body region, wherein the special effect comprises an accessory or clothing effect for modifying an appearance of the body region.

20. A non-transitory computer-readable medium embodying a program executable in a computing device, comprising:
code that obtains a digital image depicting an individual;
code that determines a context of an event associated with the digital image by extracting at least one of time and location information contained in metadata encoded in the digital image and analyzing at least one of attributes of an individual; or attributes of a scene in the digital image to determine an event associated with the digital image, wherein analyzing the attributes of the individual comprises comparing event information contained in personal data relating to a user of the computing device with a time stamp of the digital image;
code that obtains a cosmetic effect from a data store based on the determined event context; and
code that applies the obtained cosmetic effect to the digital image, wherein applying the obtained special effect to the digital image comprises:
identifying a facial region of an individual in the digital image; and
applying the special effect to the facial region, wherein the special effect comprises a cosmetic make-up effect for modifying an appearance of the facial region.

21. The non-transitory computer-readable medium of claim 20, further comprising code that compares the determined event context with a plurality of pre-defined contexts, each of the plurality of pre-defined contexts having a corresponding cosmetic effect.

22. The non-transitory computer-readable medium of claim 20, wherein the code that determines the context of the event further compares the extracted data with social media data.

* * * * *